Figure 1:
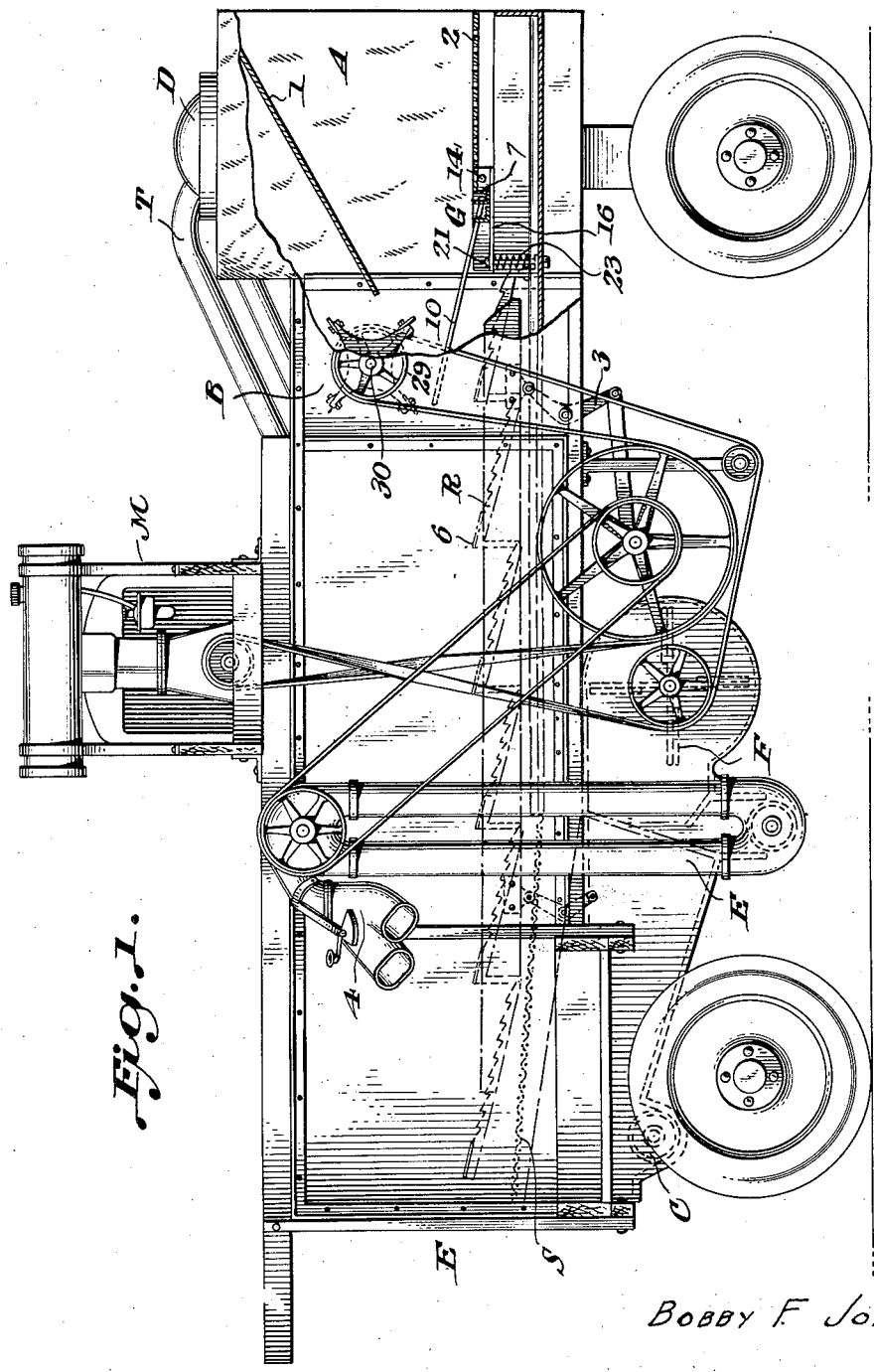

Oct. 30, 1945. B. F. JONES 2,387,796
THRESHER
Filed Aug. 17, 1943 2 Sheets-Sheet 1

Inventor
BOBBY F. JONES
By Oberlin, Limbach & Day
Attorneys

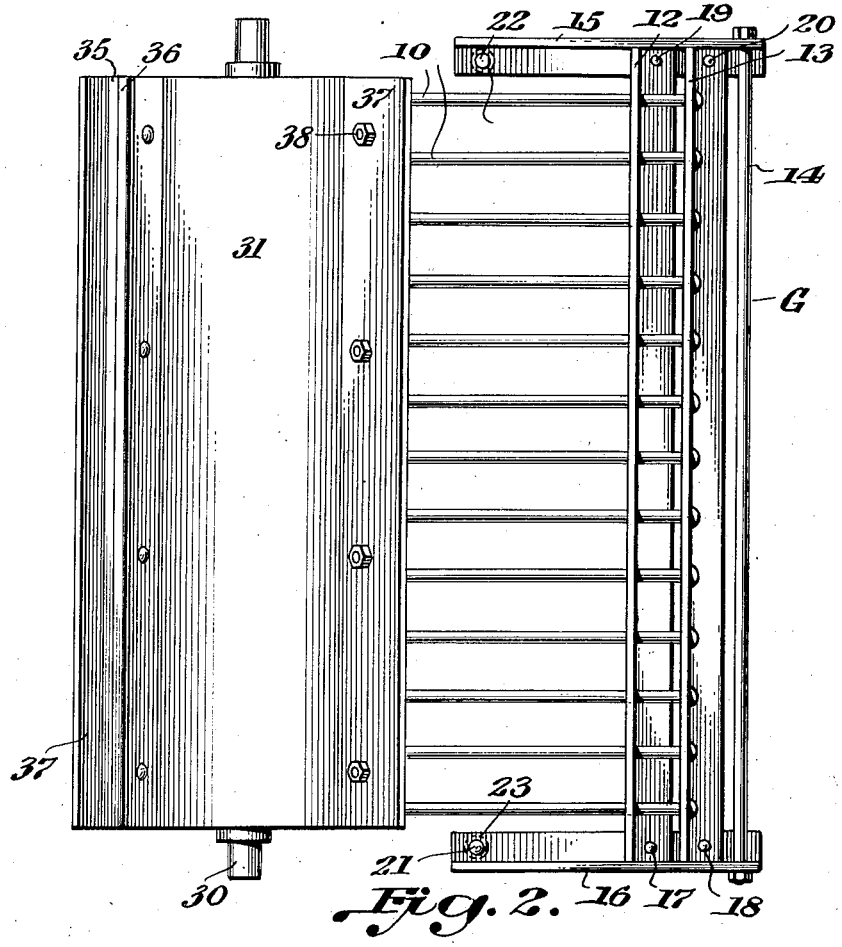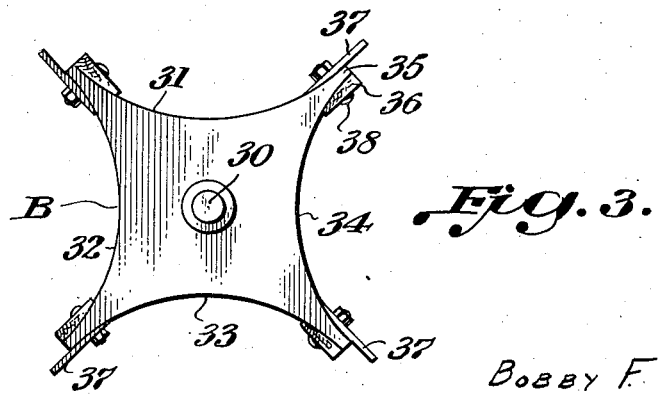

Patented Oct. 30, 1945

2,387,796

UNITED STATES PATENT OFFICE 2,387,796

THRESHER

Bobby F. Jones, Lexington, Ky.

Application August 17, 1943, Serial No. 498,991

4 Claims. (Cl. 130—27)

This invention relates to threshing machines and has for its general object the provision of a novel threshing machine which will automatically remove seed from seed bearing material. In securing this, I have aimed to provide in such a machine a construction which will be simple, expeditious in operation and which will perform all of its functions automatically and continuously on any amount of seed bearing material supplied to the machine.

More particularly, my invention comprises a hemp seed thresher for which there is an urgent need at the present time, in view of the labor shortage and difficulty in obtaining hemp from abroad. As far as I know, I am the first to provide a machine which will efficiently and economically thresh hemp.

One of the objects of my invention is to reduce the number of operations involved in conventional threshers and at the same time reduce the number of parts in a threshing machine.

Another object is to thoroughly clean hemp from hemp stalks, thus saving labor and money.

Another object is to provide a complete threshing machine or an attachment which can be easily integrated with a conventional machine by removal of parts and substituting my novel mechanism.

Another object of my invention is to obtain a greater yield of seed than is possible with methods heretofore known.

Another object is to provide a machine which directly operates upon the stalks without any preliminary treatment thereof.

Another object is to provide a machine which completely separates the seed from the seed bearing stalks in a single operation.

A further object is to provide a machine which will operate upon any size of hemp stalk, that is either the size grown for fiber, which is relatively small, or the size grown for seed, which is some three or four inches in diameter.

A still further object is to provide a machine and method for cleaning hemp, in which the wrapping of the hemp around the beater mechanism is entirely obviated.

Another object is to provide a machine for stripping seeds from hemp stalks in such manner that the stalks are not broken up into a mass of small pieces.

The annexed drawings and the following description set forth in detail one method and certain mechanism embodying the invention, such disclosed method and means constituting, however, but one of various mechanical forms in which the principle of the invention may be used.

Fig. I is a side elevation of the complete machine with parts thereof in section. Fig. II is a plain view looking from above the beater and grating. Fig. III is an end elevation of the beater.

Referring now to the drawings and more particularly, Fig. I, it will be seen that my invention comprises a feed opening generally indicated at A, this opening being bounded by an upper deflecting plate 1, a lower perforated floor 2 and the vertical side walls of the casing. A grating generally indicated by the letter G is resiliently mounted upon a hinge pin 14 and provided with a series of parallel fingers 10, which extend slightly beyond the shaft 39 upon which the beater, generally indicated at B, is mounted. The details of the grating will be set forth hereinafter and the details of the beater will also be set forth.

A series of racks, generally indicated at R, are mounted in conventional manner so as to be moved by the rocker arms, one of which is designated by the numeral 3. The rack mechanism is conventional and no further description thereof is believed necessary, except that I have improved such conventional structure by adding a flat transverse strip 6 at the upper end of each of the individual rack members. This adds materially to the rapid movement of the stalks and chaff, while at the same time permitting sufficient vibration to remove the seeds from the stalks.

A screen, generally indicated at S, is mounted under the rack mechanism and this also is conventional construction as are the screw C, elevator E leading to bagger outlet 4, and cleaning fan F. All of the moving parts of the machine are actuated by motor M which is shown mounted upon the upper surface of the casing but, of course, the motor may be mounted in any desired location. The beater B, racks R, screw C, elevator E, cleaning fan F and tailings elevator T are all actuated by the motor M, preferably by means of belts. This is believed to be conventional construction and no further description thereof is thought to be necessary.

Referring now to the grating G shown in Figs. I and II, it will be seen that this grating comprises a series of parallel fingers 10 which extend at an angle to the horizontal axis of the casing so as to rise upwardly from the floor 2 to a position immediately below the tips of beater B. These fingers 10 are preferably, loosely received in angle irons 12 and 13 and are provided with heads 11 which prevent movement to the left as shown in Fig. II. Movement to the right is prevented by the depending flange 7 of floor 2. The hinge bar 14, upon which the entire grating is mounted permits movement of the fingers 10 downwardly with respect to the beater. The angle irons 12 and 13 are secured to longitudinally extending angle irons 15 and 16 by means of bolts or rivets 17, 18, 19 and 20, and the longitudinally extending angles 15 and 16 are loosely mounted upon the hinge bar 14. A pair of vertically extending rods 21 and 22 are secured to the casing as shown in Fig. I and each rod is encircled by a compression spring 23 and 24.

It is, of course, to be understood that the series of parallel fingers 10 may be welded to either transverse angle iron 12 or 13 or both, instead of being loosely mounted in same. I prefer the loose mounting however, because removal of a bent or broken finger can be easily accomplished by merely lifting floor 2, and sliding the damaged finger to the right as viewed in Fig. I.

From the description immediately preceding, it will be seen that if the bunches of hemp stalks are pushed into the feed opening A, they first contact the perforated floor 2 and then ride upwardly over the parallel fingers 10 of the grating. If such bunches are of various sizes, this will not affect the operation of the machine due to the provisions of springs 23 and 24 which permit downward movement of the parallel fingers 10, and after passage of a large bunch restore the fingers to their normal position.

The beater generally indicated at B comprises a hollow member, preferably formed of sheet metal so as to provide a series of concave faces 31, 32, 33 and 34. These faces are substantially identical and adjacent the tip between the faces 31 and 34, for example, I have provided strip members. The strip 37 located at the trailing edge of the tip 35 is preferably formed of metal and extends somewhat beyond the tip 35. The strip 36 is preferably formed of wood and I have found oak to operate excellently. This strip 36 is mounted so that its outer edge is substantially coextensive with the outer edge of tip 35. The strips 36 and 37 are retained by means of a series of bolts 38 and the beater is mounted upon a transverse shaft 30 which is connected to a pulley 29 mounted upon the exterior of the casing and driven by belt connections as shown.

It will be noted from an inspection of Fig. I that I have devised a particular arrangement of the feed opening A with the floor 2, grating G, and beater B. The floor extends substantially in a horizontal plane so that bunches of hemp stalks may be pushed thereover with a minimum of effort, and if the bunch is very large, the deflecting plate 1 has a tendency to compress the bunch slightly. The grating G is mounted upon a support so as to move downwardly when an over-sized bunch is forced between it and the beater. It is to be noted that the beater is mounted over the free ends of the grating fingers 10 so that the strips and tips of the beater almost touch the free ends of the fingers 10 as the beater rotates. The deflecting plate 1 has a double function in that it forces the material which is initially fed between the beater tips and the grating on the downward stroke of such tips. In addition, tailings which were ejected from the dome D slide downwardly upon the deflecting plate 1 and are carried around by the beater. The rotary beater in conjunction with the resiliently mounted grating fingers have been found to be entirely sufficient to remove seed from hemp stalks, and this is done without injury to the hemp stalks so that if desired the same can be used to obtain hemp fiber.

The rack R is conventional in most respects, but I have found that a smooth transversely extending plate 6 adds to the efficiency of the thresher. This rack comprises a series of like sections which extend angularly and comprise a number of transverse bars which are spaced from each other so as to permit seed and chaff to fall downwardly upon the screen S. All of this is conventional, but the addition of the plate 6 is thought to be novel. This plate extends angularly also, but in a plane different from that of the spaced parallel bars, and in actual practice it has been found that the stalks slide smoothly over the bars and are rapidly ejected although all of the seed is removed.

The operation of my machine involves feeding bunches of hemp stalks in any convenient size to the feed opening A and pushing the bunches to the left as shown in Fig. I so that the material slides over perforated floor 2 whereupon some seeds will pass through the perforations. The bunch of stalks then contacts the arms of the beater B which pulls the stalks over the grating fingers 10 and thoroughly vibrates the stalks removing a major portion of the seed therefrom. If the stalks are unusually large, the grating G moves as a unit downwardly against the compression springs 23 and 24. After the stalks have been beaten they are ejected upon the vibrating rack mechanism R and eventually thrown from the exit end E of the casing along with the chaff. The provision of metallic plate 6 causes rapid movement of the stalks and yet permits further vibration to remove any seeds left in the stalks. The seed then passes downwardly through screen S and is lifted upwardly through elevator E to bagger outlet 4. The tailings are dropped at the extreme left hand end of the casing as viewed in Fig. I where the screw C moves the same to the tailings elevator T, and thence to the dome D. Such tailings are deposited upon the upper surface of the deflector plate 1 and slide downwardly into contact with the rotary beater B where they are again subjected to a beating action to remove all of the seed therefrom.

From the foregoing, it will be seen that I have provided a machine which, although extremely simple and easy to operate, yet, will remove seed efficiently and is particularly applicable in the threshing of hemp seed. It will be noted that various sizes of bunches may be received and that the stalks are operated upon directly and in a single operation. It will also be obvious that the machine is capable of efficiently operating upon any size of hemp stalk whether it be the fiber type or the seed type. In addition, it will be seen that I have provided means in the form of strips upon the beater, which prevent wrapping of the hemp around the beater. Finally, it will be noted that I have reduced the number of parts as well as the number of operations involved in conventional threshing machines and yet have provided an efficient device.

Having thus described my invention, what I claim is:

1. In a hemp thresher, a feed opening including a substantially straight, receiving floor terminating inwardly of the opening and terminating adjacent a resiliently mounted grating, said grating extending upwardly and away from said floor, a deflector plate, above said floor extending inwardly and downwardly and terminating in an end portion above the central portion of said grating, and a rotary beater having a series of blades extending transversely of said thresher, said beater being located just beyond the end of said deflector and over said grating, and including concave surfaces between said blades.

2. In a hemp thresher, a feed opening including a substantially straight, receiving floor terminating inwardly of the opening and terminating adjacent a resiliently mounted grating, said grating extending upwardly and away from said floor, a deflector plate, above said floor extending inwardly and downwardly and terminating in an end portion above the central portion of said grating, and a rotary beater having a series of blades extending transversely of said thresher, said beater being located just beyond the end of said deflector and over said grating, and including concave surfaces between said blades, the tips of said blades having separate metallic strips mounted on one side, said tips also having wooden strips mounted upon the opposite side, said metallic strips lying radially outward of said wooden strips.

3. In a hemp thresher, a feed opening including a substantially straight, receiving floor terminating inwardly of the opening and terminating adjacent a resiliently mounted grating, said grating extending upwardly and away from said floor, a deflector plate, above said floor extending inwardly and downwardly and terminating in an end portion above the central portion of said grating, and a rotary beater having a series of blades extending transversely of said thresher, said beater being located just beyond the end of said deflector and over said grating, said end portion of said deflector plate lying in a horizontal plane that extends below the axis of said beater.

4. In a hemp thresher, a feed opening including a substantially straight, receiving floor terminating inwardly of the opening and terminating adjacent a resiliently mounted grating, said grating extending upwardly and away from said floor, a deflector plate, above said floor extending inwardly and downwardly and terminating in an end portion above the central portion of said grating, and a rotary beater having a series of blades extending transversely of said thresher, said beater being located just beyond the end of said deflector and over said grating, said grating having a series of parallel fingers each having one end thereof mounted in a common support and a free end, said support being hingedly mounted, so as to oscillate upon an axis adjacent the terminal portion of said receiving floor, the outermost portions of said beater blades passing just above the free ends of the fingers of said grating, when said beater is rotated.

BOBBY F. JONES.